United States Patent [19]

Wild et al.

[11] Patent Number: 5,167,094

[45] Date of Patent: Dec. 1, 1992

[54] METHOD OF CORRECTING LATERAL FORCE VARIATIONS IN A PNEUMATIC TIRE

[76] Inventors: Joyce R. Wild, 1814 Kingsley Ave., Akron, Ohio 44313; Richard T. Shively, 291 Donaldson Dr., Monroe Falls, Ohio 44262

[21] Appl. No.: 833,378

[22] Filed: Feb. 10, 1992

[51] Int. Cl.⁵ .......................... B24B 49/16; B24B 1/00
[52] U.S. Cl. ................................ 51/165.77; 51/289 R; 51/DIG. 33; 51/106 R
[58] Field of Search ............ 51/165 R, 165.71, 165.74, 51/165.76, 281 R, 289 R, 326, 327, 80 R, 88, 89, 106 R, DIG. 33

[56] References Cited

U.S. PATENT DOCUMENTS

| | | | |
|---|---|---|---|
| 3,553,903 | 1/1971 | Christie | 51/281 R |
| 3,574,973 | 4/1971 | Rader | 51/DIG. 33 |
| 3,681,877 | 8/1972 | Shively et al. | 51/106 R |
| 3,739,553 | 6/1973 | Iida et al. | 51/281 R |
| 3,754,358 | 8/1973 | Shively et al. | 51/327 |
| 3,841,033 | 10/1974 | Appleby et al. | 51/289 R |
| 3,848,368 | 11/1974 | Toshioka et al. | 51/165 R |
| 3,849,942 | 11/1974 | Monajjem | 51/165 R |
| 3,914,907 | 10/1975 | Hofelt, Jr. et al. | 51/281 R |
| 3,946,527 | 3/1976 | Beer | 51/281 R |
| 4,047,338 | 3/1977 | Gormish et al. | 51/106 R |
| 4,095,374 | 6/1978 | Ugo | 51/DIG. 33 |
| 4,112,630 | 9/1978 | Brown, Jr. | 51/DIG. 33 |
| 4,128,969 | 12/1978 | Gormish et al. | 51/106 R |
| 4,173,850 | 11/1979 | Gormish et al. | 51/281 R |
| 4,912,882 | 4/1990 | Makino et al. | 51/DIG. 33 |
| 4,914,869 | 4/1990 | Bayonnet et al. | |

Primary Examiner—Bruce M. Kisliuk
Assistant Examiner—Bryan Reichenbach

[57] ABSTRACT

A method is provided for correcting excessive lateral force variations in a pneumatic tire. The method includes the steps of indexing the tire tread into a series of circumferential increments; and obtaining a series of lateral force measurements corresponding to this series of circumferential increments. The maximum value max(1) of the lateral force measurements in a first direction and the maximum value max(2) of the lateral force measurements in a second opposite direction are then determined. This determination is followed by a comparison of each of the lateral force measurements with the max(2) value to determine if it exceeds an acceptable deviation and an independent comparison of each of the lateral force measurements with the max(1) value to determine if it exceeds the acceptable deviation. The acceptable deviation may be a preset constant value. Alternatively, the acceptable deviation may be determined by calculating a PtP value which represents the difference between the max(1) value and the max(2) value; and calculating the acceptable deviation based on the magnitude of this PtP value. Material is removed from a first shoulder region of each increment in which the corresponding force measurement exceeds the acceptable deviation when compared to the max(2) value; and material is removed from a second shoulder region of each increment in which the corresponding lateral force measurement exceeds the acceptable deviation when compared to the max(1).

18 Claims, 11 Drawing Sheets

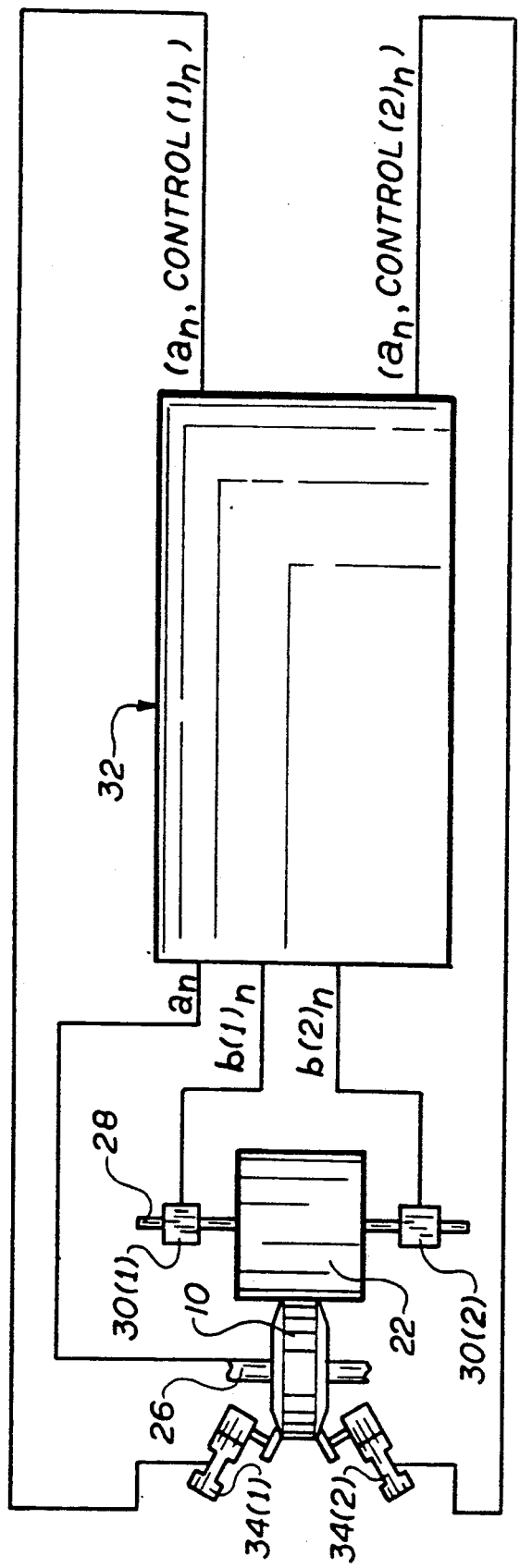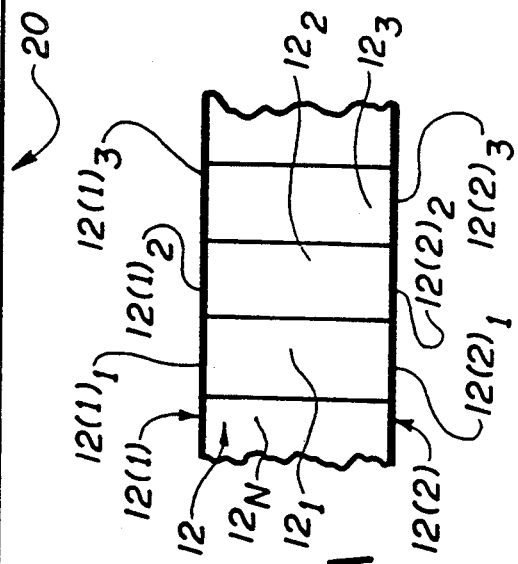

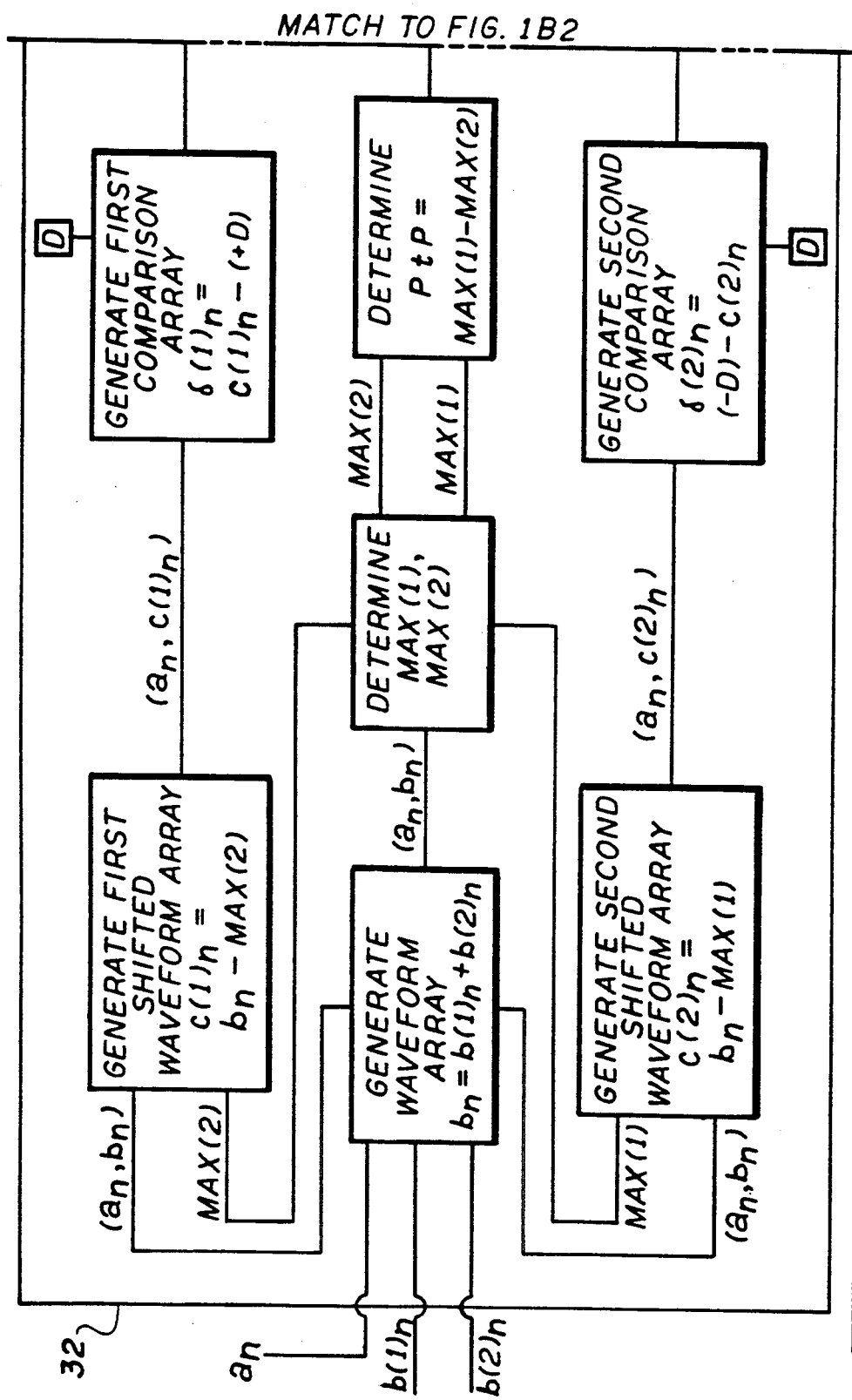
FIG. 1B1

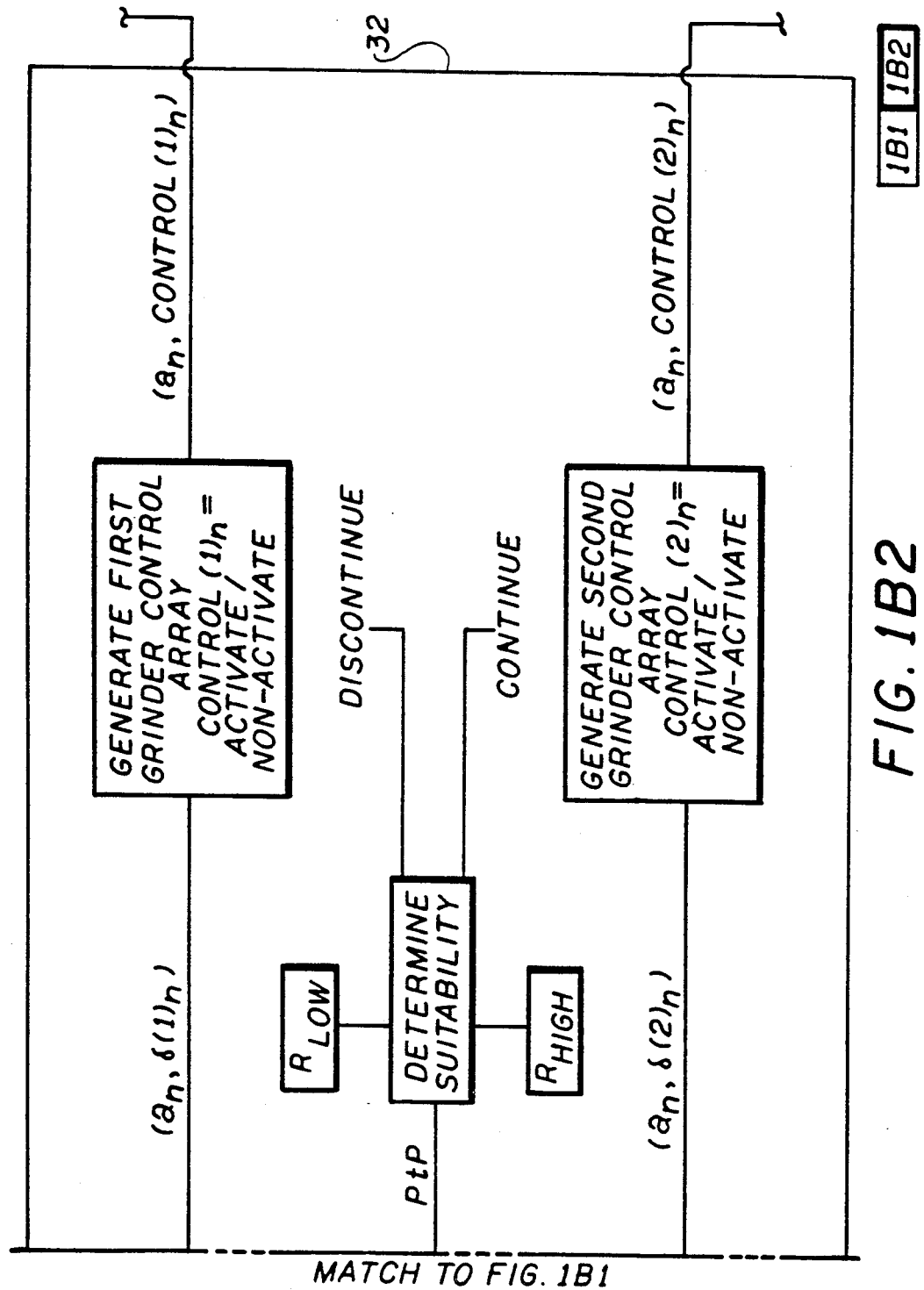

METHOD OF CORRECTING LATERAL FORCE VARIATIONS IN A PNEUMATIC TIRE

FIELD OF THE INVENTION

This invention relates to a method of correcting excessive lateral force variations in a pneumatic tire.

BACKGROUND OF THE INVENTION

In the construction of pneumatic tires, it is believed to be virtually impossible to economically manufacture an absolutely uniform tire because of the many variables involved in a tire's construction. Consequently, pneumatic tires, as manufactured, almost inevitably possess a certain degree of non-uniformity. The effects of non-uniformity are best explained by noting that several types of forces are simultaneously exerted by a tire during its rotation under load against a surface. For example, lateral forces, which are of particular importance in the present application, are exerted in the axial direction of the tire or in a direction parallel to its plane of rotation. In a non-uniform tire, the lateral forces exerted by the tire will vary or change during its rotation. In other words, the magnitude and/or direction of the lateral force exerted by the tire will depend on which increment of its tread is contacting the surface.

The variation in lateral force during rotation of a tire, or "lateral force variation", is usually caused by differences in the stiffness and/or geometry of the tire about its circumference, or tread. If these differences are slight, the lateral force variation will be insignificant and its effects unnoticeable when the tire is installed on a vehicle. However, when such differences reach a certain level, the lateral force variation may be significant enough to cause rough riding conditions and/or difficult handling situations.

Consequently, methods have been developed to correct for excessive lateral force variation in a pneumatic tire by removing material from the shoulders of the tire tread. Most conventional lateral force variation correction methods include the steps of indexing the tire tread into a series of circumferential increments and obtaining a series of lateral force measurements representative of the lateral force exerted by the tire as these increments contact a surface. This data is then interpreted and material is removed from the tire tread in a pattern related to this interpretation.

Lateral force variation correction methods are commonly performed with a tire-uniformity machine which includes an assembly for rotating a test tire against the surface of a freely rotating loading drum. This arrangement results in the loading drum being moved in a manner dependent on the forces exerted by the rotating tire whereby lateral forces may be measured by appropriately placed measuring devices. In a sophisticated tire-uniformity machine, the lateral force measurements are interpreted by a computer and material is removed from the tire tread by grinders controlled by the computer.

The interpretation step of a lateral force correction method usually entails the generation of waveform data. This waveform data may be viewed as an array including a series of increment identifiers (which identify the increment contacting the surface) and a corresponding series of lateral force measurements (which represent the total lateral force exerted by the tire when the identified increment contacts the surface). For analytical purposes, it is often helpful to plot the lateral force measurements against the increment identifiers to generate a "lateral force variation waveform."

The waveform data is used, in some manner, by most lateral force correction methods. However, the interpretation of this data, and the related removal of material, differs from method to method. For example, in U.S. Pat. No. 4,047,338 to Gormish (assigned to the assignee of the present application), the interpretation of the lateral force variation waveform includes approximating it to a harmonic (or sine) curve and removing material from alternate shoulders of the tire treads in 180° lengths according to the shape of this harmonic curve. However, methods which approximate the variation waveform to a harmonic curve sometimes disguise, and thus do not efficiently correct, problems areas of certain waveforms. More particularly, in contrast to a harmonic curve which always has one upper apex and one lower apex, a lateral force variation waveform will often include multiple apexes and other non-harmonic characteristics.

Another procedure for interpreting the waveform and relating this interpretation to material removal is set forth in U.S. Pat. No. 3,946,527 to Beer. In the lateral force correction method disclosed in this patent, the maximum lateral force and the maximum variation from this maximum lateral force are determined by the waveform's deviation from a preset variation range (which is centered about the mean of the point representing the maximum lateral force and the point representing the greatest variation from this force). Material is then removed from the locations on the tire tread corresponding to the maximum force measurement and the maximum variation from this measurement. While the Beer correction method may eliminate some of the inaccuracies associated with harmonic approximation, it does not efficiently accommodate multiple apexes.

For these reasons, a need remains for a method of correcting lateral force variation in a pneumatic tire which efficiently accommodates lateral force variation patterns corresponding to waveforms having multiple apexes and/or other non-harmonic characteristics.

SUMMARY OF THE INVENTION

The present invention provides a method of correcting lateral force variation in a pneumatic tire which efficiently accommodates lateral force variation patterns corresponding to waveforms having multiple apexes and/or other non-harmonic characteristics. The method is preferably performed with a tire uniformity machine including a freely rotating loading drum, an assembly which rotates the tire against the loading drum, measurement devices which measure the lateral force exerted by the tire as it rotates against the loading drum, grinders which are adapted to move into and out of cutting engagement with the tire tread shoulders, and a computer which interprets the measurements and which controls the grinders.

More particularly, the present invention provides a lateral force correction method including the steps of indexing the tire tread into a series of circumferential increments, and obtaining a series of lateral force measurements corresponding to these increments. The maximum value max(1) of the lateral force measurements in a first direction is determined and the maximum value max(2) of the lateral force measurements in a second opposite direction is determined. This determination is followed by a comparison of each of the lateral force measurements with the max(2) value to determine if it exceeds an acceptable deviation and a comparison of each of the lateral force measurements with the max(1) value to determine if it exceeds the acceptable deviation. The acceptable deviation may be a preset constant number. Alternatively, the acceptable deviation may be determined by calculating a PtP value which represents the difference between the max(1) value and the max(2) value; and calculating the acceptable deviation based on this magnitude of this PtP value.

Material is removed from a first shoulder region of each increment in which the corresponding force measurement exceeds the acceptable deviation when compared to the max(2) value; and material is removed from a second shoulder region of each increment in which the corresponding lateral force measurement exceeds the acceptable deviation when compared to the max(1) value. This removal is preferably accomplished by providing first and second grinders adapted to move in and out of cutting engagement with the first and second shoulders, respectively. The first grinder is controlled in relation to the comparison of the lateral force measurements with the max(2) value and the second grinder is controlled in relation to the comparison of the lateral force measurements with the max(1) value. The measurement obtainment, max(1)/max(2) determination, acceptable deviation comparison, and material removal steps are repeated until the lateral force variation in the tire reaches an acceptable level.

These and other features of the invention are fully described and particularly pointed out in the claims. The following description and annexed drawings set forth in detail one illustrative embodiment of the invention. However this embodiment is indicative of but one of the various ways in which the principles of the invention may be employed.

BRIEF DESCRIPTION OF THE DRAWINGS

In the annexed drawings:

FIG. 1 is a diagram, partly in block form, which schematically illustrates a method for correcting lateral force variations in a pneumatic tire;

FIG. 1A is an enlarged view of the tread of the tire shown in FIG. 1;

FIG. 1B is a flow diagram of a procedure for interpreting lateral force measurements and controlling material removal according to the present invention;

DETAILED DESCRIPTION

Figure 2:
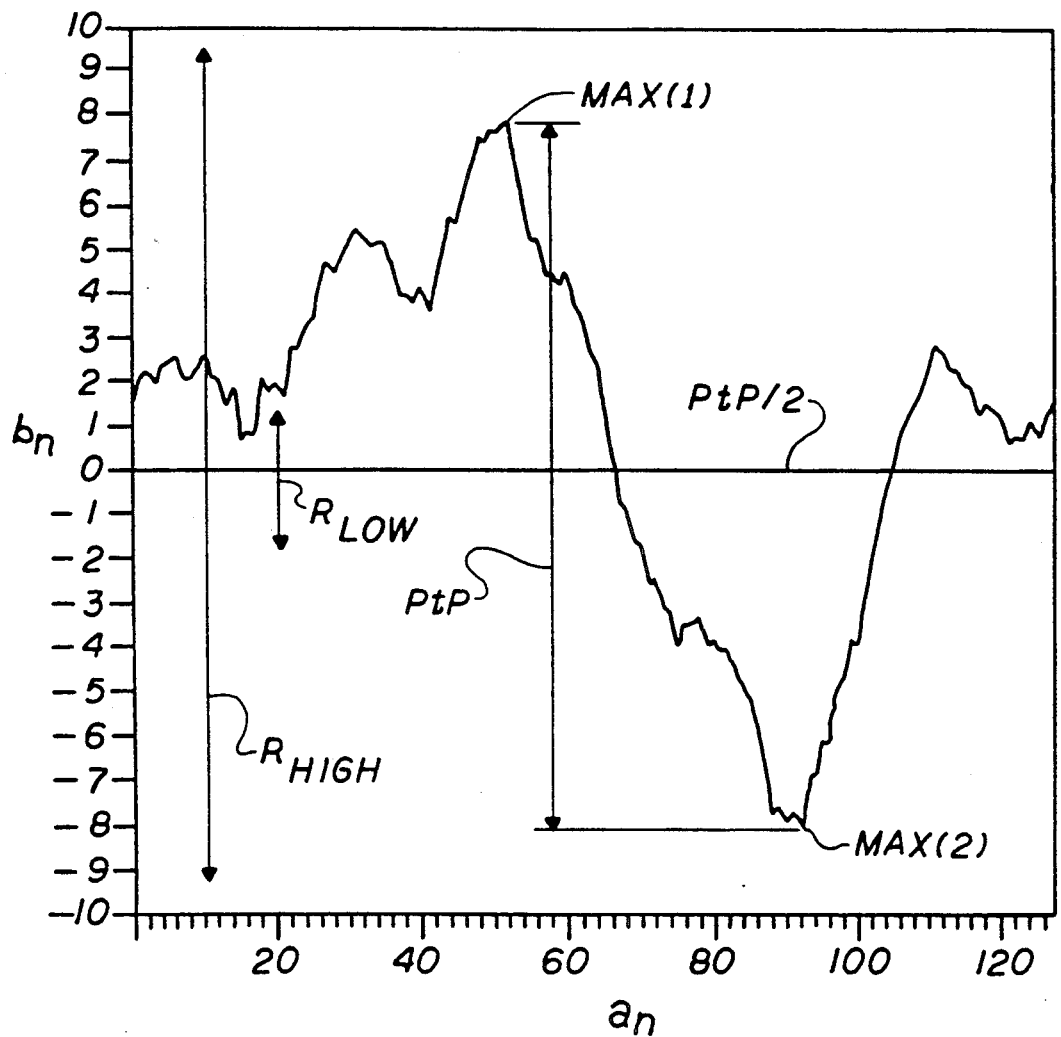
FIG. 2 is a graph of an initial lateral force variation waveform for the tire, the waveform having a max(1) point representing a maximum force value in a first direction and a max(2) point representing the maximum force value in a second opposite direction, the waveform being shown distributed about a zero reference representing the mean of the max(1) and max(2) points.

Referring now to the drawings in detail and initially to FIGS. 1–1B, a method of correcting for lateral force variations in a pneumatic tire 10 is schematically illustrated. As shown, the tire 10 has a circumferential tire tread 12 which includes a first shoulder 12(1) and a second shoulder 12(2). (See FIG. 1A). In the illustrated diagram, the tire 10 is horizontally oriented whereby the tread shoulder 12(1) is the top shoulder and the tread shoulder 12(2) is the bottom shoulder.

The tire tread 12 is initially indexed into a series of circumferential increments $12_{1-N}$, each of which includes a first shoulder region and a second shoulder region. (See FIG. 1A). As such, the circumferential increments $12_{1-N}$ may be viewed as collectively including first shoulder regions $12(1)_{1-N}$ and second shoulder regions $12(2)_{1-N}$. The number ("N") of the increments $12_{1-N}$, and their size and spacing, are chosen so that the lateral force variation of the tire 10 will be accurately represented. In the illustrated embodiment, the tire tread 12 is indexed into 128 equally sized and equally spaced increments.

The increments $12_{1-N}$ are assigned identifiers $a_{1-N}$ for reference during the lateral force correction method. For example, the identifiers $a_{1-N}$ could represent the relative angular location of the increment on the tire tread (i.e. 2°, 4° ... 360°). Alternatively, the identifiers $a_{1-N}$ could simply represent the sequential order of the increments $12_{1-N}$ on the tire tread 12 (i.e. 1, 2, 3, ... N). This latter convention will be adopted in the present discussion, whereby in the preferred embodiment the identifiers $a_{1-N}$ consist of the numerals 1 through 128.

In the method of the present invention, excessive lateral force variation in the tire 10 is corrected by removing material from certain regions of the tire tread 12, namely its shoulders 12(1) and 12(2). The method generally includes the step of obtaining a series of lateral force measurements representative of the force exerted by the tire 10 as the circumferential increments $12_{1-N}$ sequentially contact a surface. This data is then interpreted and material is removed from the tire tread 12 in a pattern related to this interpretation. As explained in more detail below, the interpretation/removal steps are performed in a manner which accommodates lateral force variation patterns corresponding to waveforms having multiple apexes and/or other non-harmonic characteristics.

The lateral force variation correction method is preferably performed with a tire-uniformity machine 20. The schematically illustrated machine 20 includes an assembly for rotating the tire 10 against the surface of a freely rotating loading drum 22. More particularly, the machine 20 includes a rotating axle 26 on which the tire 10 is mounted for controlled rotation and a non-rotating axle 28 on which the loading drum 22 is mounted for free rotation. This arrangement results in the loading drum 22 being moved in a manner dependent on the forces exerted by the tire 10 as it rotates. These forces are measured by appropriately placed measurement devices 30(1) and 30(2) positioned along the drum axle 28 and these measurements are conveyed to a computer 32. The computer 32 interprets the measurements and controls grinders 34(1) and 34(2) (which are adapted to move into and out of cutting engagement with the tire tread shoulders 12(1) and 12(2), respectively) to remove material from the tire tread 12 in a manner related to this interpretation.

During an initial stage of the method, the measurements devices 30(1) and 30(2) convey to the computer 32 signals $b(1)_{1-N}$ and $b(2)_{1-N}$, respectively, which represent lateral force measurements as each of the increments $12_{1-N}$ of the tire tread 12 contacts the loading drum 22. Additionally, increment identifier signals $a_{1-N}$ corresponding to the increments $12_{1-N}$ being measured are simultaneously conveyed to the computer 32. Thus, as shown schematically in FIG. 1B, the computer 32 will receive the following raw data array:

$(a_n, b(1)_n, b(2)_n)$ wherein $n = 1 - N (N = 128$ in the illustrated example)

$a_n$ = the identifier of the increment $12_n$ contacting the loading drum 22;

$b(1)_n$ = the lateral force measurement taken by the first measuring device 30(1) when the increment $12_n$ contacts the loading drum 22;

and $b(2)_n$ = the lateral force measurement taken by the second measuring device 30(2) when the increment $12_n$ contacts the loading drum 22.

The computer 32 is programmed to convert this array of raw data into the following waveform data array:

$(a_n, b_n)$ wherein $b_n = (b(1)_n + b(2)_n)$

Thus, the variable $b_n$ represents the sum of the lateral force measurements, and therefore the total, lateral force exerted by the tire 10 when the tread increment $12_n$ contacts the loading drum 22. A graph of the initial waveform data is illustrated in FIG. 2, and as shown, while the waveform may roughly approximate a harmonic curve, it includes multiple apexes and other non-harmonic characteristics.

The computer 32 then determines the maximum value max(1) of the lateral force measurements $b_n$ in a first direction and the maximum value max(2) of the lateral force measurements $b_n$ in a second direction. For clarity and consistency in explanation, the convention will be adopted that the first direction will be in the upward direction and the second direction will be in the downward direction. (It may be noted that an analogous convention is used in the referencing of the tire shoulders 12(1) and 12(2), the measuring devices 30(1) and 30(2), and the grinders 34(1) and 34(2).) In the illustrated embodiment, the max(1) value is approximately equal to 7.8, and the max(2) value is approximately equal to 7.8. Thus, the lateral force measurement of the greatest magnitude in the upward direction will be the max(1) value and the lateral force measurement of the greatest magnitude in the downward direction will be the max(2) value.

The computer 32 is programmed to include a "suitability check" which verifies that the tire 10 is a suitable candidate for lateral force variation corrections. In this verification, a "peak-to-peak" value PtP, which represents the lateral force variation range, is initially calculated by computing the difference between the max(1) and max(2) values. In the waveform shown in FIG. 2, the reference zero coincides with the mean of the PtP value, or PtP/2. In this manner, the plotted max(1) and max(2) points are equal in magnitude and opposite in direction. In the illustrated example, the PtP value is approximately equal to 15.6.

The PtP value is then compared to a preset range $R_{low}$ which represents the upper limits of unnoticeable lateral force variation. If the PtP value is less than $R_{low}$, initial lateral force variation corrections are not necessary because any existing lateral force variation would not be noticeable when the tire 10 is installed on a vehicle. Optionally and preferably, the PtP value may also be compared to a preset range $R_{high}$ which represents the lower limits of lateral force variation not correctable by material removal techniques. If the PtP value is greater than $R_{high}$, lateral force variation corrections may not be possible, because, for instance, the amount of material removal necessary to make such corrections would exceed industry accepted limits. In either event, the tire would be exempt from further lateral force correction procedures.

In the illustrated example, the PtP value is greater than $R_{low}$ and less than $R_{high}$ whereby the tire 10 is a suitable candidate for the correction method. As such, the lateral force correction method is continued and this continuation may include the calculation of the magnitude of a current acceptable deviation D based on magnitude of the PtP value. For example, this calculation could include calculating a certain preset percentage x% of the PtP value. While this percentage x% would vary depending on the nature of the tire 10 and/or other factors, it would usually be between 10% and 40%. Alternatively, and as illustrated, the value D could be a preset constant number which remains the same regardless of the magnitude of the PtP value. In the illustrated example, the magnitude of the acceptable deviation D is equal to 10.

The program 32 is programmed to then perform a first interpretation of relevant data, and a second independent interpretation of relevant data. The relevant data for the first interpretation includes the waveform array $(a_n, b_n)$, the max(2) value, and the magnitude of D; the relevant data for the second interpretation includes the waveform array $(a_n, b_n)$, the max(1) value, and the magnitude of D. As explained in more detail below, these independent interpretations result in independent control of the grinders 34(1) and 34(2).

Examining initially the first interpretation, each lateral force measurement $b_n$ is compared to the max(2) value to determine if forces are excessive in the upward direction. Preferably, this comparison is accomplished by shifting the waveform data array $(a_n, b_n)$ so that the max(2) value is referenced at zero thereby generating the following first shifted waveform array:

$(a_n, c(1)_n)$ wherein $c(1)_n = b_n - max(2)$

The differential between the first shifted waveform to the acceptable deviation D is then determined. Because this interpretation is concerned with excessive lateral forces in the upward direction, the sign of the deviation is positive whereby in the illustrated embodiment D is equal to a +10. This determination generates the following first differential array:

$(a_n, \delta(1)_n)$ wherein $\delta(1)_n = c(1)_n - D$ (In an actual embodiment, the first differential array could be generated in a single step by simply setting $\delta(1)_n$ equal to $b(1)_n - max(2) - D$.)

Figure 3:
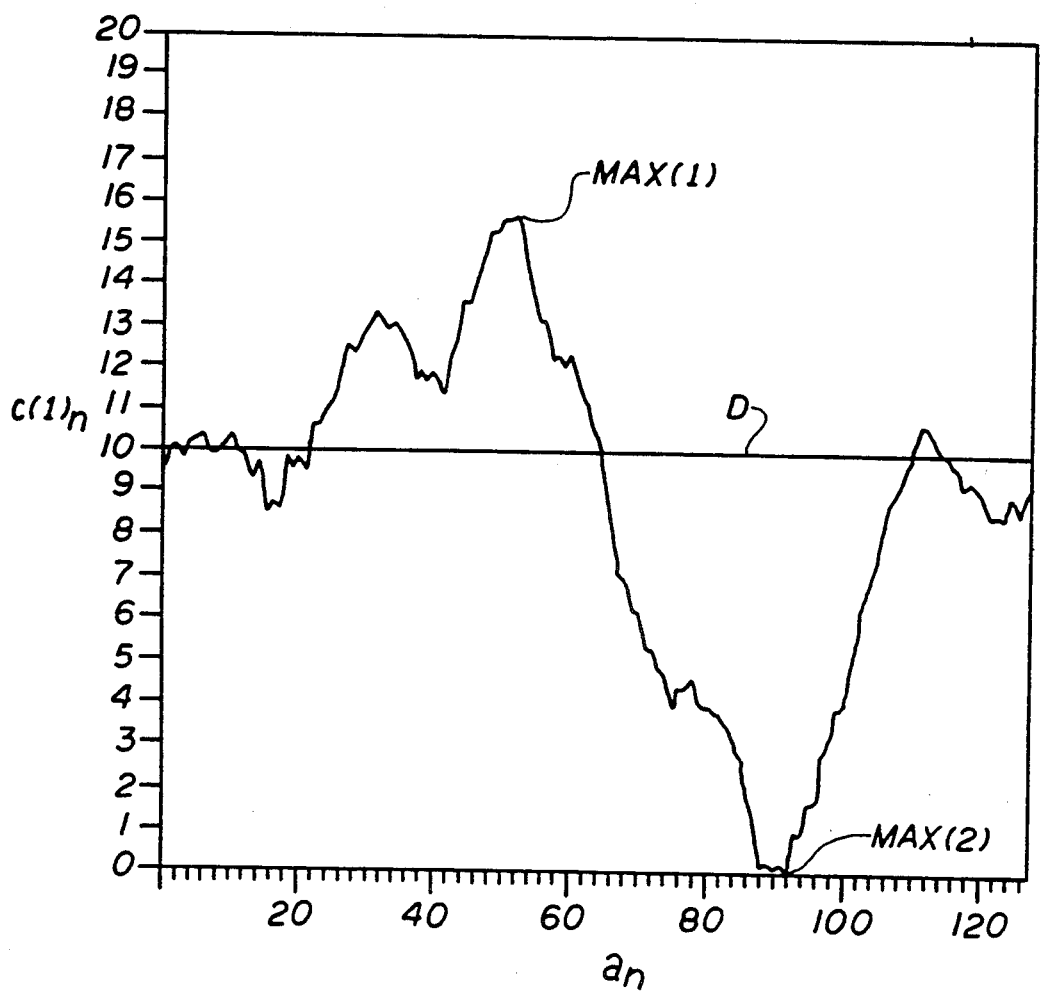
FIG. 3 is a graph of a first shifted waveform (specifically the waveform of FIG. 2 shifted in such a manner that the zero reference is located at the max(2) point) and a line D representing the current greatest acceptable deviation from the max(2) point.

The first shifted waveform array $(a_n, c(1)_n)$ is shown graphically in FIG. 3, along with a line representing the acceptable deviation D. The portions of the first shifted waveform located below the line D correspond to locations on the tire 10 whereat $\delta(1)_n$ is less than zero, and thus no corrections are necessary, at least as far as the first interpretation is concerned. For example, for the "80th" increment $12_{80}$:

$(a_{80}, c(1)_{80}) = (80, 4)$ (approximately)

$(a_{80}, \delta(1)_{80}) = (a_{80}, c(1)_{80} - D)$
$= (80, (4) - (+10))$
$= (80, -6)$
$\therefore \delta(1)_{80} \leq 0$ Conversely, the portions of the first shifted waveform located above the line D correspond to locations on the tire 10 whereat $\delta(1)_n$ is greater than zero and thus corrections are necessary. For example, for the "40th" increment $12_{40}$:

$(a_{40}, c(1)_{40}) = (40, 12)$ (approximately)

Figure 5:
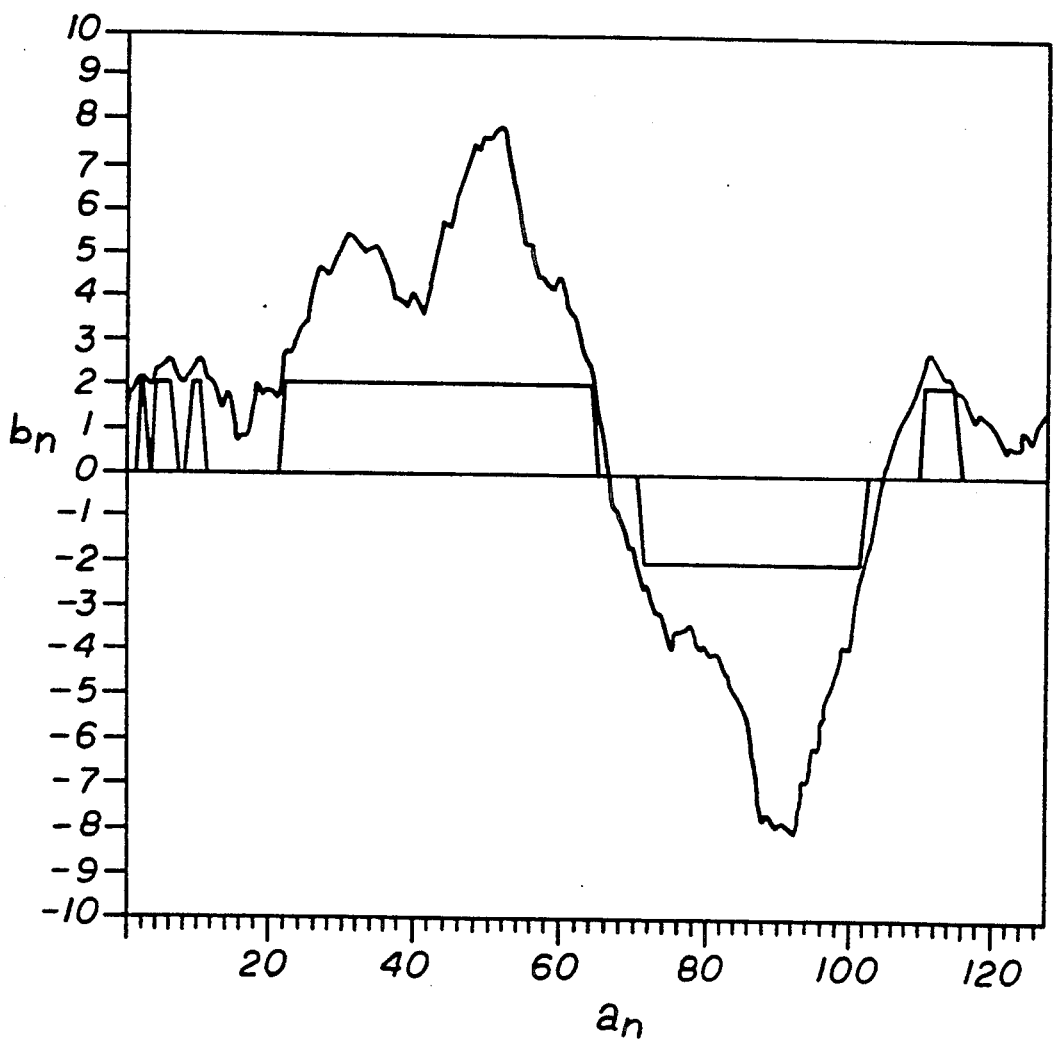
FIG. 5 is a graph of the waveform of FIG. 2, which represents the activation/nonactivation of grinders during the initial stage of material removal according to the present invention.

$(a_{40}, \delta(1)_{40}) = (40, c(1)_{40} - D)$
$= (40, (12 - 10))$
$= (40, 2)$
$\therefore \delta(1)_{40} > 0$ To perform the necessary corrections, material is appropriately removed from the tire 10 at the locations exceeding the acceptable deviation D. More particularly, the first grinder 34(1) is activated to remove material on the first or top shoulder regions $12a_{1-N}$ in which $\delta(1)_n$ is greater than the zero. The material is removed from the top shoulder regions $12a_{1-N}$ because the excessive lateral force is directed upwardly. The activation/nonactivation of the grinders during this initial stage of material removal are shown schematically in the graph illustrated in FIG. 5. The control of the first grinder 34(1) may be accomplished by converting the first differential array $(a_n, \delta(1)_n)$ into the following first grinder control array:

$(a_n, control(1)_n)$ wherein $control(1)_n = $ "nonactivate"   if $\delta(1)_n \leq 0$
$control(1)_n = $ "activate"   if $\delta(1)_n > 0$ Thus, in reference to the "80th" and "40th" increments $12_{80}$ and $12_{40}$, respectively:

$\delta(1)_{80} \leq 0$  $\therefore$  $(a_{80}, control(1)_{80}) = (80, nonactivate)$ $\delta(1)_{40} > 0$  $\therefore$  $(a_{40}, control(1)_{40}) = (40, activate)$ Turning now to the second interpretation, a similar procedure is performed except that each lateral force measurement $b_{1-N}$ is compared to the max(1) value to determine if it is excessive in the downward direction. These calculations specifically include generating a second shifted waveform array $(a_n, c(2)_n)$ (wherein $c(2)_n = b_n - max(2)$); generating a second differential array $(a_n, \delta(2)_n)$ (wherein D is assigned a negative sign and wherein $\delta(2)_n = (D - c(2)_n)$; and generating a second grinder control array $(a_n, control(2)_n)$ (wherein $control(2)_n = $"activate" if $\delta(1)_n > 0$; and $control_n = $ "nonactivate" if $\delta(1)_n \leq 0$). Again, in an actual embodiment, the second differential array could be generated in a single step by simply setting $\delta(2)_n = (D - b(2)_n - max(2))$.

Figure 4:
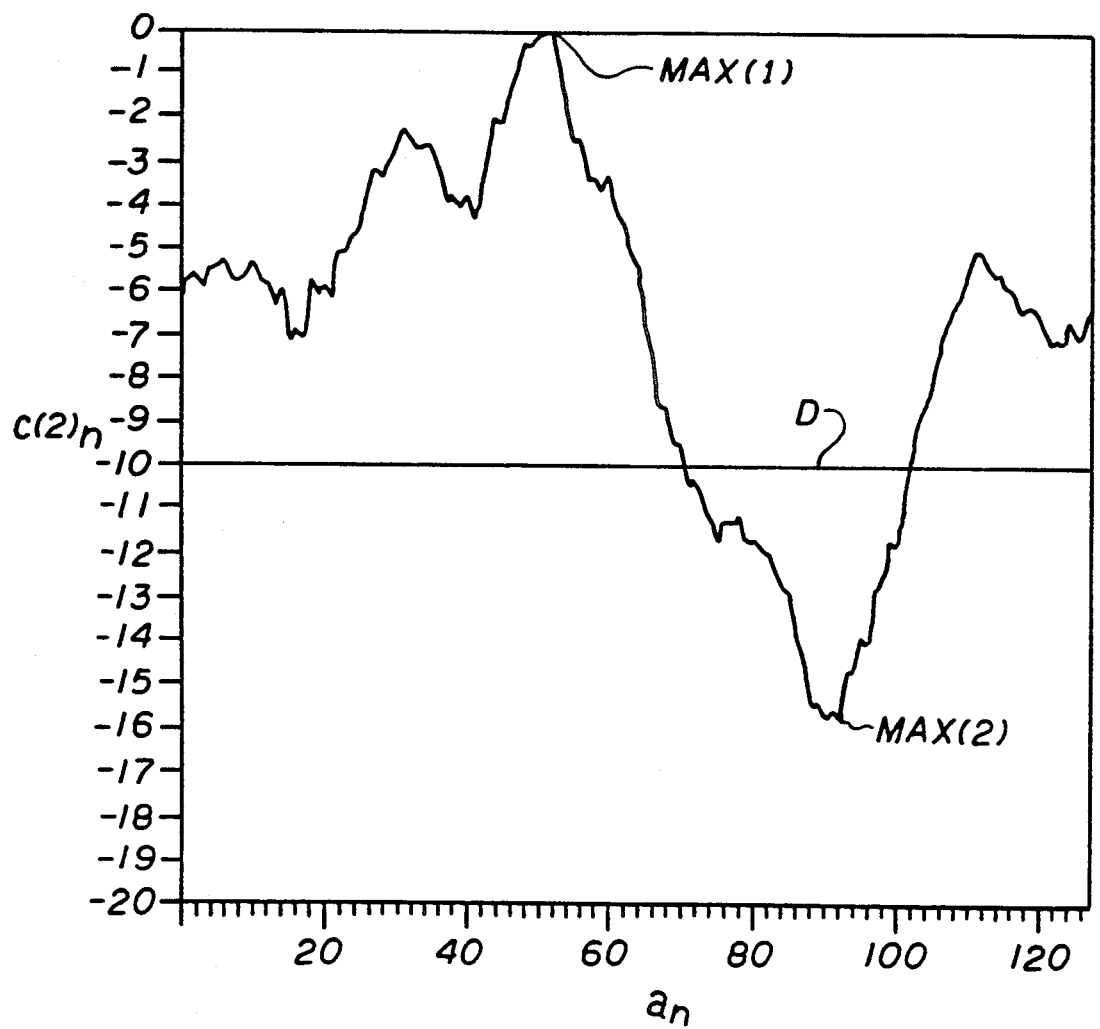
FIG. 4 is a graph of a second shifted waveform (specifically, the waveform of FIG. 2 shifted in such a manner that the zero reference is located at the max(1) point) and a line D representing the current greatest acceptable deviation from the max(1) point.

The second shifted waveform data $(a_n, c(2)_n)$ is shown graphically in FIG. 4, along with a line representing the acceptable deviation D. The portions of the first shifted waveform located above the line D correspond to locations on the tire 10 whereat $\delta(2)_n$ is less than or equal to zero, and thus corrections by the second station 36(2) are not necessary. For example, for the 40th increment $12_{40}$:

$(a_{40}, c(2)_{40}) = (40, -4)$ (approximately)

$(a_{40}, \delta(2)_{40}) = (40, D - c(2)_{40})$
$= (40, (-10) - (-4))$
$= (40, -6)$
$\therefore \delta(2)_{80} \leq 0$ $(a_{40}, control(2)_{40}) = (40, nonactivate)$ Conversely, the portions of the second shifted waveform located below the line D correspond to locations on the tire 10 whereat $\delta(2)_n$ is greater than zero and thus corrections are necessary. For example, for the 80th increment $12_{80}$:

$(a_{80}, c(2)_{80}) = (80, -12)$ (approximately)

-continued $$(a_{80}, \delta(2)_{80}) = (80, D - c(2)_{80})$$
$$= (80, (-10) - (-12))$$
$$= (80, 2)$$
$$\therefore \delta(2)_{80} > 0$$

$$(a_{80}, \text{control}_{80}) = (80, \text{activate})$$

The preferred material removal procedure is performed by positioning the tire 10 so that the increment $12_1$ is aligned with the grinders 34(1) and 34(2). More particularly, the first shoulder increment region $12(1)_1$ and the second shoulder increment region $12(2)_1$ are aligned with the grinders 34(1) and 34(2), respectively. (This alignment is also preferably controlled by the computer 32.) The corresponding grinder control signals control(1)$_1$ and control(2)$_2$ are then sent to the grinders 34(1) and 34(2), respectively, to remove, if appropriate, material from this increment of the tire tread 12.

The tire 10 is then rotated so that increment $12_2$ is aligned with the grinders 34(1) and 34(2), the corresponding control signals control(1)$_1$ and control(2)$_2$ are sent thereto, and appropriate material removal is conducted. This cycle is repeated until the increment $12_N$ is aligned with the grinders and any necessary grinding of this increment is completed. Preferably, only a very slight, and set, amount of material is removed from each relevant tread shoulder regions $12(1)_n$ and $12(2)_n$ during this stage of the method. Thus, amount of material removed is the same for each relevant increment $12_n$, regardless of the magnitude of the corresponding excessive lateral force (i.e. the value of the variables $\delta(1)_n$ and $\delta(2)_n$).

Figure 6:
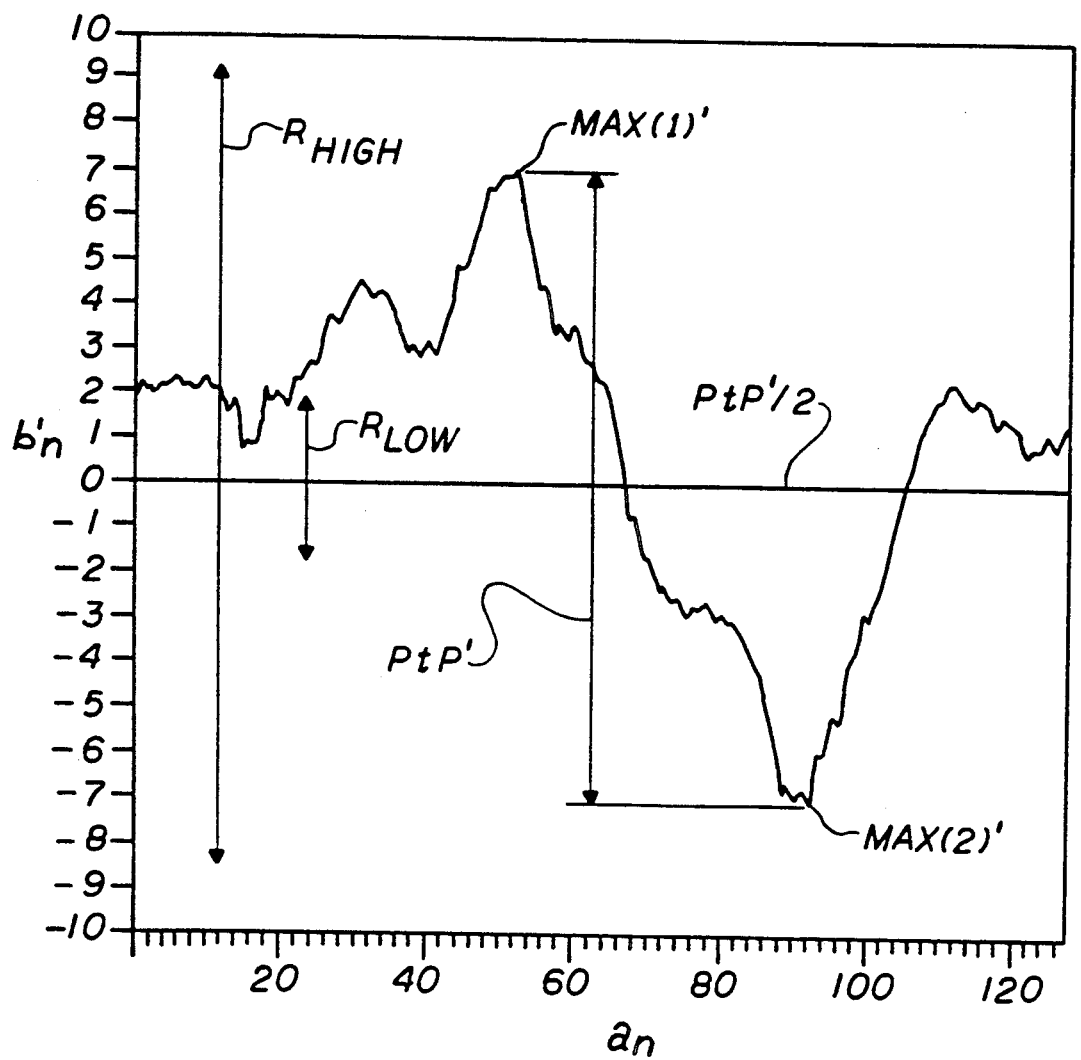
FIG. 6 is a graph of a lateral force variation waveform for the tire after numerous stages of material removal have been completed, the waveform having a max(1)' point representing a maximum force value in a first direction and a max(2)' point representing the maximum force value in a second opposite direction, the waveform being shown distributed about a zero reference representing the mean of the max(1)' and max(2)' points.

After this initial stage of the method is completed, subsequent stages are initiated which essentially repeat the steps performed during the initial stage. More particularly after completed, the measurements devices 30(1) and 30(2) convey to the computer 32 signals $b(1)_{1-N}'$ and $b(2)_{1-N}'$, along with corresponding increment identifier signals $a_{1-N}'$ and the computer converts this raw data into a waveform data array $(a_n', b_n')$. A graph of this subsequent waveform data is illustrated in FIG. 6, and as shown, the shape of the waveform differs somewhat that of the initial waveform shown in FIG. 2.

The max(1)' and max(2)' values of the lateral force measurements $b_n'$ are then determined and in the illustrated embodiment, the max(1)' value is approximately equal to 7, and the max(2)' value is approximately equal to 7. A "suitability check" is then done to verify that the further lateral force variation corrections are necessary. Specifically, a new "peak-to-peak" value PtP' is generated by computing the difference between the max(1)' and max(2)' values and this PtP' value is compared to the preset range $R_{low}$. If the PtP' value is less than $R_{low}$, further lateral force variation corrections are not necessary and the lateral force correction method will be discontinued. (The PtP' value may also be compared to the preset range $R_{high}$, however this step is often unnecessary in subsequent stages of the methods.)

In the illustrated example, the PtP' value is 14 which is greater than $R_{low}$ whereby further lateral force variation corrections are necessary. As such, the lateral force correction method is continued, with the acceptable deviation remaining equal to 10. However it is important to note that a current value D' may be recalculated during each stage of the present method, such as by determining x% of the current "peak-to-peak" value PtP'.

Figure 7:
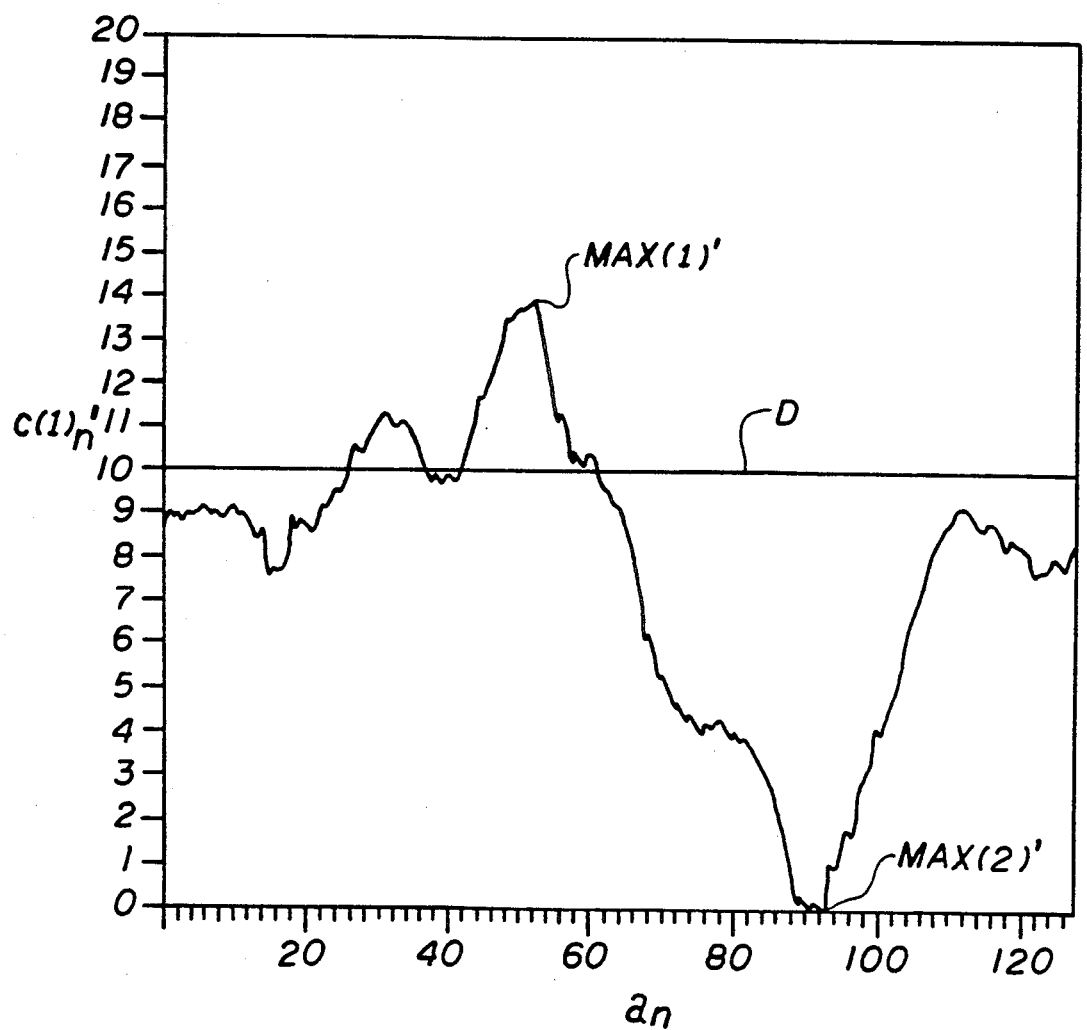
FIG. 7 is a graph of a first shifted waveform (specifically the waveform of FIG. 6 shifted in such a manner that the zero reference is located at the max(2)' point) and a line D' representing the current greatest acceptable deviation from the max(2)' point.
Figure 8:
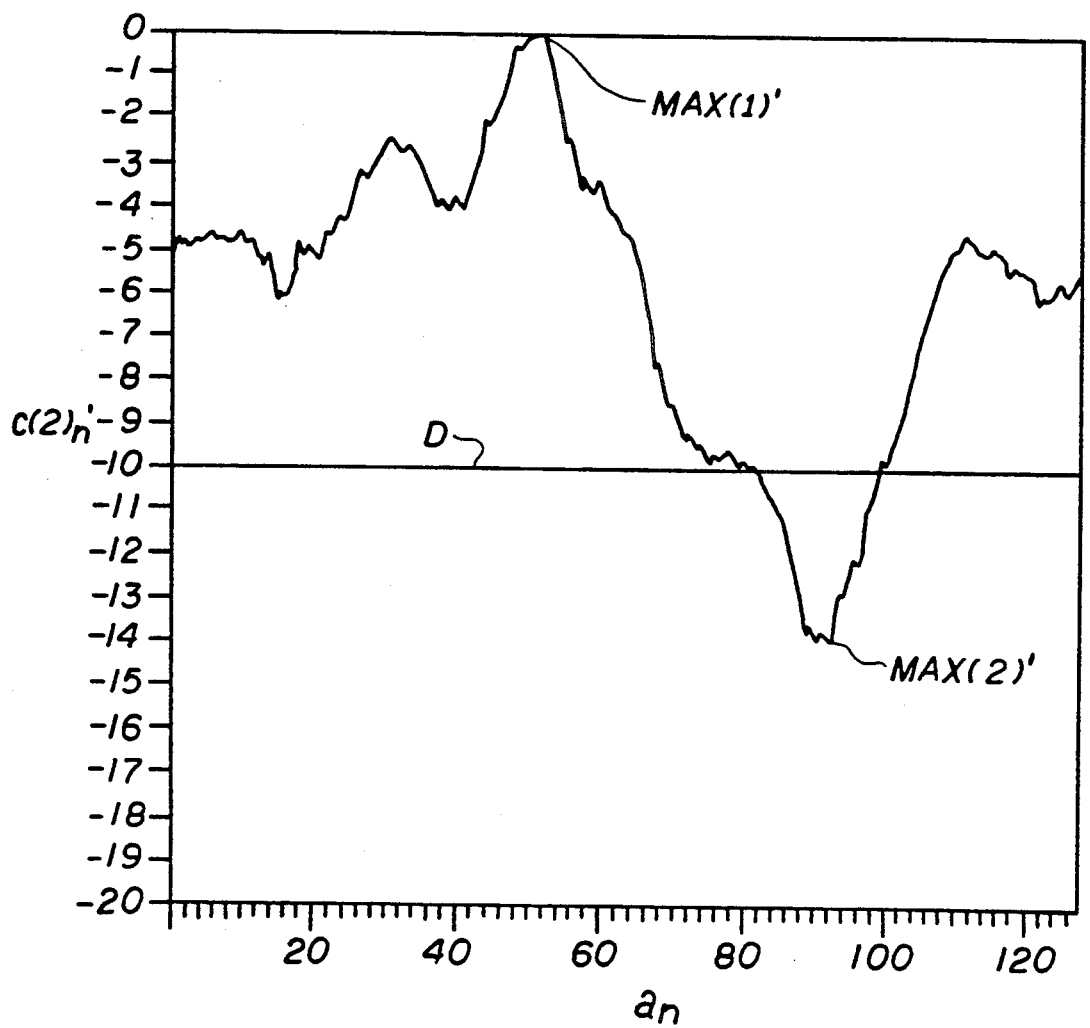
FIG. 8 is a graph of a second shifted waveform (specifically, the waveform, of FIG. 6 shifted in such manner that the zero reference is located at the max(1)' point) and a line D' representing the current greatest acceptable deviation from the max(1) point.
Figure 9:
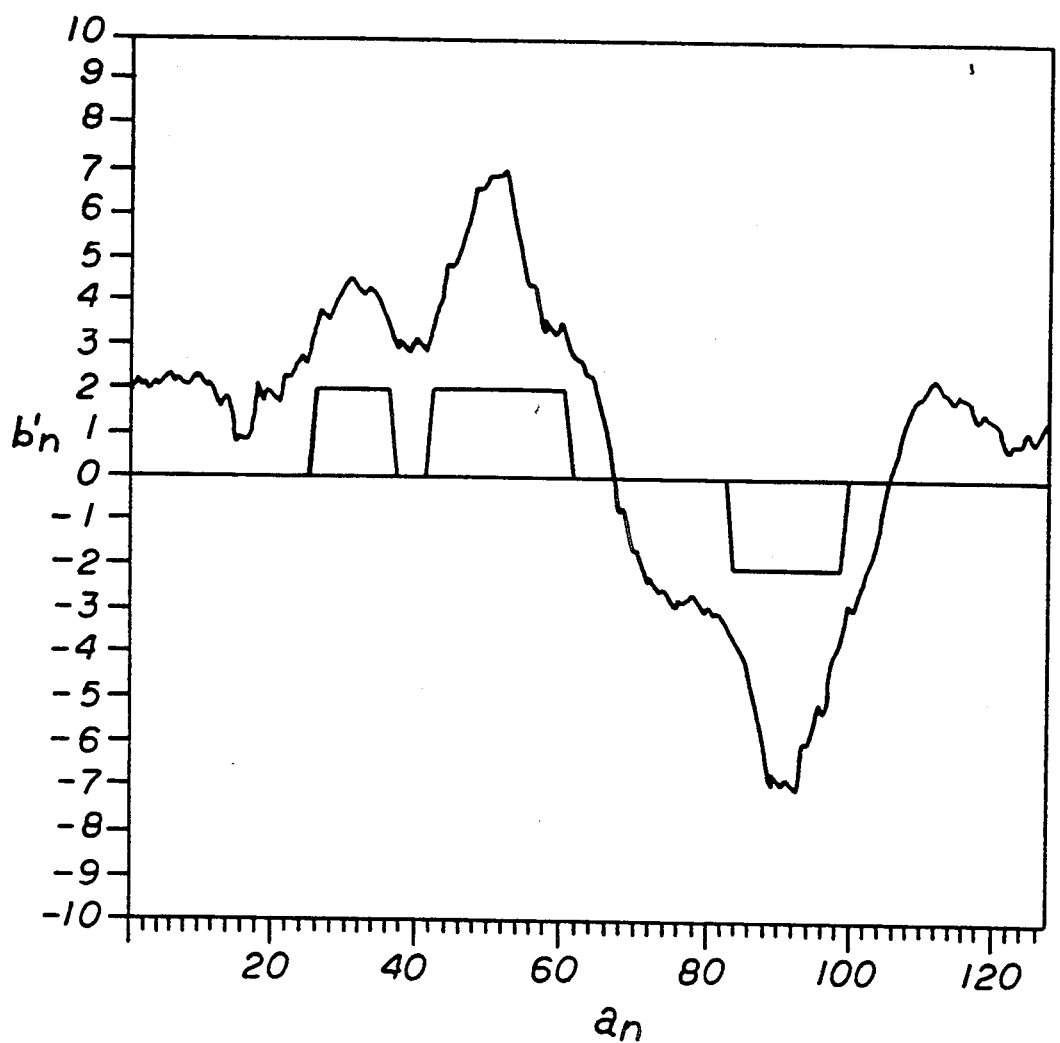
FIG. 9 is a graph of the waveform of FIG. 6, which represents the activation/nonactivation of grinders for material removal during this subsequent stage of material removal according to the present invention.

A first interpretation is performed to generate a first shifted waveform array $(a_n', c(1)_n')$, a first differential array $(a_n', \delta(1)_n')$ and a first grinder control array $(a_n', \text{control}(1)_n')$; and a second interpretation is performed to generate a second shifted waveform array $(a_n', c(2)_n')$, a second differential array $(a_n', \delta(2)_n')$ and a second grinder control array $(a_n', \text{control}(2)_n')$. The first shifted waveform data $(a_n', c(1)_n')$ is shown graphically in FIG. 7, along with a line representing the acceptable deviation D' and the second shifted waveform data $(a_n', c(2)_n')$ is shown graphically in FIG. 7, along with a line representing the acceptable deviation D'. The first grinder 34(1) and the second grinder 34(2) are then appropriately activated to remove material on the first shoulder regions $12(1)_{1-N}$ and the second shoulder regions $12(2)_{1-N}$, respectively, as shown schematically in FIG. 8.

The method is then repeated for subsequent stages until the lateral force variation in the tire 10 reaches an acceptable range, or $R_{min}$.

It should be noted that the illustrated and described programming of the computer 32 is merely for explanatory purposes and other programming methods are possible with, and contemplated by, the present invention. More particularly, the computer 32 must merely be programmed to interpret the lateral force measurements by: determining a maximum value max(1) of the lateral force measurements in a first direction; determining a maximum value max(2) of the lateral force measurements in a second opposite direction; comparing each of the lateral force measurements with the max(2) value to determine if it exceeds an acceptable deviation; and comparing each of the lateral force measurements with the max(1) value to determine if it exceeds the acceptable deviation. For example, the computer could be programmed to generate the following arrays:

| a shifted waveforms array: $(a_n, c(1)_n, c(2)_n)$ | (including both the first and second shifted waveform data); |
|---|---|
| a differentials array: $(a_n, \delta(1)_n, \delta(2)_n)$ | (including both the first and second differential data); and |
| a grinder control array: $(a_n, \text{control}(1)_n, \text{control}(2)_n)$ | (including both the first and second grinder control data). |

One may now appreciate that the present invention provides a lateral force variation correction method which accommodates lateral force variation patterns corresponding to waveforms having multiple apexes and/or other non-harmonic characteristics. Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A method for correcting excessive lateral force variations in a pneumatic tire having a circumferential tire tread with first and second shoulders, said method comprising the steps of:

indexing the tire tread into a series of circumferential increments each of which includes a first shoulder region and a second shoulder region;

obtaining a series of lateral force measurements corresponding to the series of circumferential increments of the tire tread;

determining a maximum value max(1) of the lateral force in a first direction and a maximum value max(2) of the lateral force measurements in a second opposite direction;

comparing each of the lateral force measurements with the max(2) value to determine which of these measurements exceed an acceptable deviation;

comparing each of the lateral force measurements with the max(1) value to determine which of these measurements exceed the acceptable deviation;

removing material from the first shoulder region of each increment in which the corresponding force measurement exceeds the acceptable deviation when compared to the max(2) value; and removing material from the second shoulder region of each increment in which the corresponding lateral force measurement exceeds the acceptable deviation when compared to the max(1) value.

2. The method of claim 1 wherein said removing steps comprise the steps of:

providing a first grinder adapted to move in and out of cutting engagement with the first shoulder;

providing a second grinder adapted to move in and out of cutting engagement with the second shoulder;

controlling the first grinder in relation to the comparison of the lateral force measurements with the max(2) value; and controlling the second grinder in relation to the comparison of the lateral force measurements with the max(1) value.

3. A method as set forth in claim 2 wherein said removing steps comprise the steps of:

aligning the first shoulder region of one of the increments with the first grinder and aligning the second shoulder region of this increment with the second grinder;

activating the first grinder if the corresponding force measurement exceeds the acceptable deviation when compared to the max(2) value;

activating the second grinder if the corresponding force measurement exceeds the acceptable deviation when compared to the max(1) value; and repeating these alignment and activation steps for each increment of the tire tread.

4. A method as set forth in claim 1 wherein said removing steps comprise the steps of:

removing a set amount of material from the first shoulder region of each increment in which the corresponding force measurement exceeds the acceptable deviation when compared to the max(2) value, regardless of the magnitude of this excess; and removing a set amount of material from the second shoulder region of each increment in which the corresponding force measurement exceeds the acceptable deviation when compared to the max(1) value, regardless of the magnitude of this excess.

5. The method of claim 1 wherein said comparing steps comprise the steps of:

calculating a PtP value which represents the difference between the max(1) value and the max(2) value; and calculating the acceptable deviation based on the magnitude of the PtP value.

6. The method of claim 5 wherein said step of calculating the acceptable deviation includes the step of calculating a certain preset percentage of the PtP value.

7. A method as set forth in any of claims 1-6 wherein said obtaining, determining, comparing, and removing steps are repeated until the lateral force variation in the tire reaches an acceptable level.

8. The method of either of claims 5 or 6 wherein said removing steps comprise the steps of:

providing a first grinder adapted to move in and out of cutting engagement with the first shoulder;

providing a second grinder adapted to move in and out of cutting engagement with the second shoulder;

controlling the first grinder in relation to the comparison of the lateral force measurements with the max(2) value; and controlling the second grinder in relation to the comparison of the lateral force measurements with the max(1) value.

9. A method as set forth in claim 7 wherein said removing steps comprise the steps of:

aligning the first shoulder region of one of the increments with the first grinder and aligning the second shoulder region of this increment with the second grinder;

activating the first grinder if the corresponding force measurement exceeds the acceptable deviation when compared to the max(2) value;

activating the second grinder if the corresponding force measurement exceeds the acceptable deviation when compared to the max(1) value; and repeating these alignment and activation steps for each increment of the tire tread.

10. A method as set forth in either of claims 5 or 6 wherein said removing steps comprise the steps of:

removing a set amount of material from the first shoulder region of each increment in which the corresponding force measurement exceeds the acceptable deviation when compared to the max(2) value, regardless of the magnitude of this excess; and removing a set amount of material from the second shoulder region of each increment in which the corresponding force measurement exceeds the acceptable deviation when compared to the max(1) value, regardless of the magnitude of this excess.

11. A method as set forth in either of claims 5 or 6 further comprising the steps of:

setting a range $R_{low}$ which represents the upper limits of unnoticeable lateral force variations; and comparing the PtP value with the range $R_{low}$ to verify that lateral force variation corrections are necessary.

12. A method as set forth in claim 11 further comprising the steps of:

setting a range $R_{high}$ which represents the lower limits of lateral force variation not correctable by material removal techniques; and comparing the PtP value with the range $R_{high}$ to verify that the tire is a suitable candidate for lateral force variation corrections.

13. A method as set forth in claim 1 further comprising the steps of:
  calculating a PtP value which represents the difference between the max(1) value and the max(2) value;
  setting a range $R_{low}$ which represents the upper limits of unnoticeable lateral force variations; and
  comparing the PtP value with the range $R_{low}$ to verify that lateral force variation corrections are necessary.

14. A method as set forth in claim 13 further comprising the steps of:
  setting a range $R_{high}$ which represents the lower limits of lateral force variation not correctable by material removal techniques; and
  comparing the PtP value with the range $R_{high}$ to verify that the tire is a suitable candidate for lateral force variation corrections.

15. A method for correcting excessive lateral force variations in a pneumatic tire having a circumferential tire tread with first and second shoulders, said method comprising the steps of:
  providing a tire uniformity machine including a freely rotating loading drum, an assembly which rotates the tire against the loading drum, measurement devices which measure the lateral force exerted by the tire as it rotates against the loading drum, grinders which are adapted to move into and out of cutting engagement with the tire tread shoulders, and a computer which interprets the measurements and which controls the grinders;
  indexing the tire tread into a series of circumferential increments each of which includes a first shoulder region and a second shoulder region;
  using the measuring devices to obtain a series of lateral force measurements corresponding to the series of circumferential increments of the tire tread;
  conveying these force measurements to the computer;
  programming the computer to interpret these measurements by:
    determining a maximum value max(1) of the lateral force measurements in a first direction;
    determining a maximum value max(2) of the lateral force measurements in a second opposite direction;
    comparing each of the lateral force measurements with the max(2) value to determine if it exceeds an acceptable deviation,
    comparing each of the lateral force measurements with the max(1) value to determine if it exceeds the acceptable deviation;
  controlling the first grinder to remove material from the first shoulder region of each increment in which the corresponding force measurement exceeds the acceptable deviation when compared to the max(2) value; and
  controlling the second grinder to remove material from the second shoulder region of each increment in which the corresponding lateral force measurement exceeds the acceptable deviation when compared to the max(1) value.

16. The method of claim 15 wherein said step of programming the computer to interpret includes the step of programming the computer to:
  calculate a PtP value which represents the difference between the max(1) value and the max(2) value; and
  calculate the acceptable deviation based on the magnitude of the PtP value.

17. The method of claim 16 wherein said step of calculating the acceptable deviation includes the step of calculating a certain preset percentage of the PtP value.

18. The method of any of claims 15-17 wherein said steps of controlling the grinders includes the step of programming the computer to control the grinders by:
  conveying signals to the first grinder which causes it to remove material from the first shoulder region of each increment in which the corresponding force measurement exceeds the acceptable deviation when compared to the max(2) value, and
  conveying signals to the second grinder which cause it to remove material from the second shoulder region of each increment in which the corresponding lateral force measurement exceeds the acceptable deviation when compared to the max(1) value.

* * * * *